US006933979B2

(12) United States Patent
Gonzales et al.

(10) Patent No.: US 6,933,979 B2
(45) Date of Patent: Aug. 23, 2005

(54) METHOD AND SYSTEM FOR RANGE SENSING OF OBJECTS IN PROXIMITY TO A DISPLAY

(75) Inventors: Cesar Augusto Gonzales, Katonah, NY (US); Lurng-Kuo Liu, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 930 days.

(21) Appl. No.: 09/735,756

(22) Filed: Dec. 13, 2000

(65) Prior Publication Data

US 2002/0071036 A1 Jun. 13, 2002

(51) Int. Cl.[7] ................................................ H04N 5/235

(52) U.S. Cl. .................. 348/362; 348/333.12; 348/370

(58) Field of Search ......................... 348/207.99, 207.1, 348/207.11, 211.99, 239, 241, 333.01, 333.11, 333.12, 362, 370, 373, 375, 14.01, 14.04, 14.05, 14.08, 14.07, 222.1; 345/863

(56) References Cited

U.S. PATENT DOCUMENTS

| | | | | | |
|---|---|---|---|---|---|
| 5,436,656 | A | * | 7/1995 | Soga et al. | 348/220.1 |
| 5,612,733 | A | * | 3/1997 | Flohr | 348/14.16 |
| 6,118,485 | A | * | 9/2000 | Hinoue et al. | 348/373 |
| 6,344,875 | B1 | * | 2/2002 | Hashimoto et al. | 348/207.1 |
| 6,462,781 | B1 | * | 10/2002 | Arnold | 348/373 |

* cited by examiner

*Primary Examiner*—Tuan Ho

(74) *Attorney, Agent, or Firm*—Ohlandt, Greeley, Ruggiero & Perle, L.L.P.; Daniel P. Morris

(57) ABSTRACT

The invention relates to a method for sensing the range of objects captured by an image or video camera using active illumination from a computer display. This method can be used to aid in vision based segmentation of objects.

In the preferred embodiment of this invention, we compute the difference between two consecutive digital images of a scene captured using a single camera located next to a display, and using the display's brightness as an active source of lighting. For example, the first image could be captured with the display set to a white background, whereas the second image could have the display set to a black background. The display's light reflected back to the camera and, consequently, the two consecutive images' difference, will depend on the intensity of the display illumination, the ambient room light, the reflectivity of objects in the scene, and the distance of these objects from the display and the camera. Assuming that the reflectivity of objects in the scene is approximately constant, the objects which are closer to the display and the camera will reflect larger light differences between the two consecutive images. After thresholding, this difference can be used to segment candidates for the object in the scene closest to the camera. Additional processing is required to eliminate false candidates resulting from differences in object reflectivity or from the motion of objects between the two images.

6 Claims, 2 Drawing Sheets

METHOD AND SYSTEM FOR RANGE SENSING OF OBJECTS IN PROXIMITY TO A DISPLAY

FIELD OF THE INVENTION

The invention relates to a method for discriminating the range of objects captured by an image or video camera using active illumination from a computer display. This method can be used to aid in vision based segmentation of objects.

BACKGROUND OF THE INVENTION

Range sensing techniques are useful in many computer vision applications. Vision-based range sensing techniques have been investigated in the computer vision literature for many years; for example, they are described in D. Ballard and C. Brown, Computer Vision, Prentice Hall, 1982. These techniques require either structured active illumination projectors as in K. Pennington, P. Will, and G. Shelton, "Grid coding: a novel technique for image analysis. Part 1. Extraction of differences from scenes", IBM Research Report RC-2475, May, 1969; M. Maruyama and S. Abe, "Range sensing by projecting multiple slits with random cuts", IEEE Trans. on Pattern Analysis and Machine Intelligence, Vol. 15, No. 6, pp. 647–651, June, 1993; and U.S. Pat. No. 4,269,513 "Arrangement for Sensing the Surface of an Object Independent of the Reflectance Characteristics of the Surface", P. DiMatteo and J. Ross, May 26, 1981, or multiple input camera devices as in J. Clark, "Active photometric stereo", Proceedings IEEE Computer Society Conference on Computer Vision and Pattern Recognition, pp. 29–34, June, 1992; and Sishir Shah and J. K. Aggarwal, "Depth estimation using stereo fish-eye lenses, IEEE International Conference on Image Processing, Vol. 1, pp. 740–744, 1994; or cameras with multiple focal depth adjustments as in S. Nayar, M. Watanabe, and M. Noguchi, "Real-time focus range sensor", IEEE Trans. on Pattern Analysis and Machine Intelligence, Vol. 18, No. 12, pp. 1186–1197, 1996; all of which are expensive to implement.

The present invention's focus is on range sensing methods that are simple and inexpensive to implement in an office environment. The motivation is to enhance the interaction of users with computers by taking advantage of the image and video capture devices that are becoming ubiquitous with office and home personal computers. Such an enhancement could be, for example, windows navigation using human gesture recognition, or automatic screen customization and log-in using operator face recognition, etc. To implement these enhancements, we use computer vision techniques such as image object segmentation, tracking, and recognition. Range information, in particular, can be used in vision-based segmentation to extract objects of interest from a sometimes complex environment.

To sense range, Pennington et al. cited above, uses a camera to detect the reflection patterns from an active source of illumination projecting light strips. For this technique to work, it is required to project a slit of light in a darkened room or to use a laser-based light source under normal room illumination. Clearly, none of these options are practical in the normal home or office environment.

Accordingly, the present invention envisions a novel and inexpensive method for range sensing using a general-purpose image or video camera, and the illumination of a computer's display as an active source of lighting. As opposed to Pennington's method which uses light striping, we do not require that the display's illumination have any special structure to it.

SUMMARY OF THE INVENTION

In one embodiment of this invention, the difference is computed between two consecutive digital images of a scene, captured using a single camera located next to a display, and using the display's brightness as an active source of lighting. For example, the first image could be captured with the display set to a black background, whereas the second image could have the display set to a white background. The display's light is reflected back to the camera and, consequently, the two consecutive images' difference will depend on the intensity of the display illumination, the ambient room light, the reflectivity of objects in the scene, and the distance of these objects from the display and the camera. Assuming that the reflectivity of objects in the scene is approximately constant, the objects which are closer to the display and the camera will reflect larger light differences between the two consecutive images. After thresholding, this difference can be used to segment candidates for the object in the scene closest to the camera. Additional processing is required to eliminate false candidates resulting from differences in object reflectivity or from the motion of objects in the two images. This processing is described in the detailed description.

Briefly stated, the broad aspect of the invention is a method and system for video object range sensing comprising a computer having a display; a video camera for receiving or capturing images of objects in an environment, the video camera being connected to the computer wherein the computer display's brightness is operable as an active source of lighting.

The forgoing and still further objects and advantages of the present invention will be more apparent from the following detailed explanation of the preferred embodiments of the invention in connection with the accompanying drawings.

DESCRIPTION OF THE PREFERRED EMBODIMENT

We consider an office environment where the user sits in front of his personal computer display. We assume that an image or video camera is attached to the PC, an assumption which is supported by the emergence of image capture applications in PC. This leads to new human-computer interfaces such as gesture. The idea is to develop such interfaces under the existing environment with minimum or no modification. The novel features of the proposed system include a color computer display for illumination control and means for discriminating the range of the interested objects for further segmentation. Thus, excepting for standard PC equipment and an image capture camera attached to the PC (which is becoming commonplace due to the emergence of image capture applications in PC), no additional hardware is required.

Figure 1:
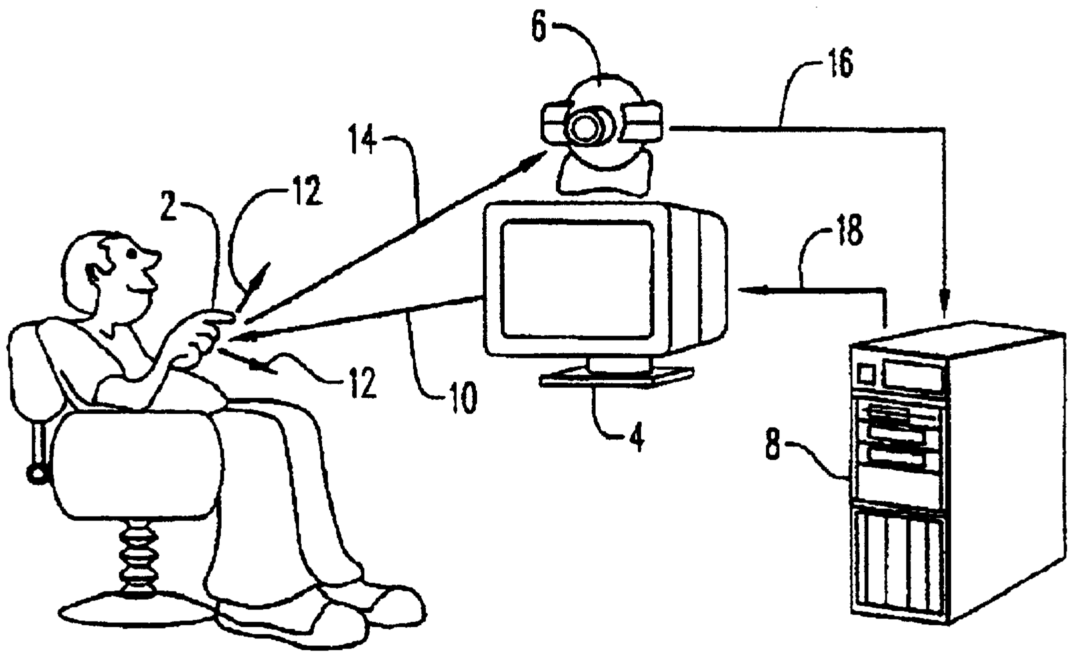
FIG. 1 is a block diagram of a preferred embodiment of the system of the present invention in an office environment.

FIG. 1 is a schematic diagram of a system, according to the present invention, for determining range information of an interested object 2. The object 2 can be any object, for example, a user's hand. Object 2 is subjected to light 10 generated by computer display 4. The brightness of the computer display 4 is controlled by a computer 8 through line 18. The light 10 illuminates the surface of object 2, generating reflection as shown by arrows 12. The reflection 12 sensed by a camera 6 is represented by arrow 14. The camera 6 captures images and transmits them to a computer 8 for processing through line 16.

Figure 2:
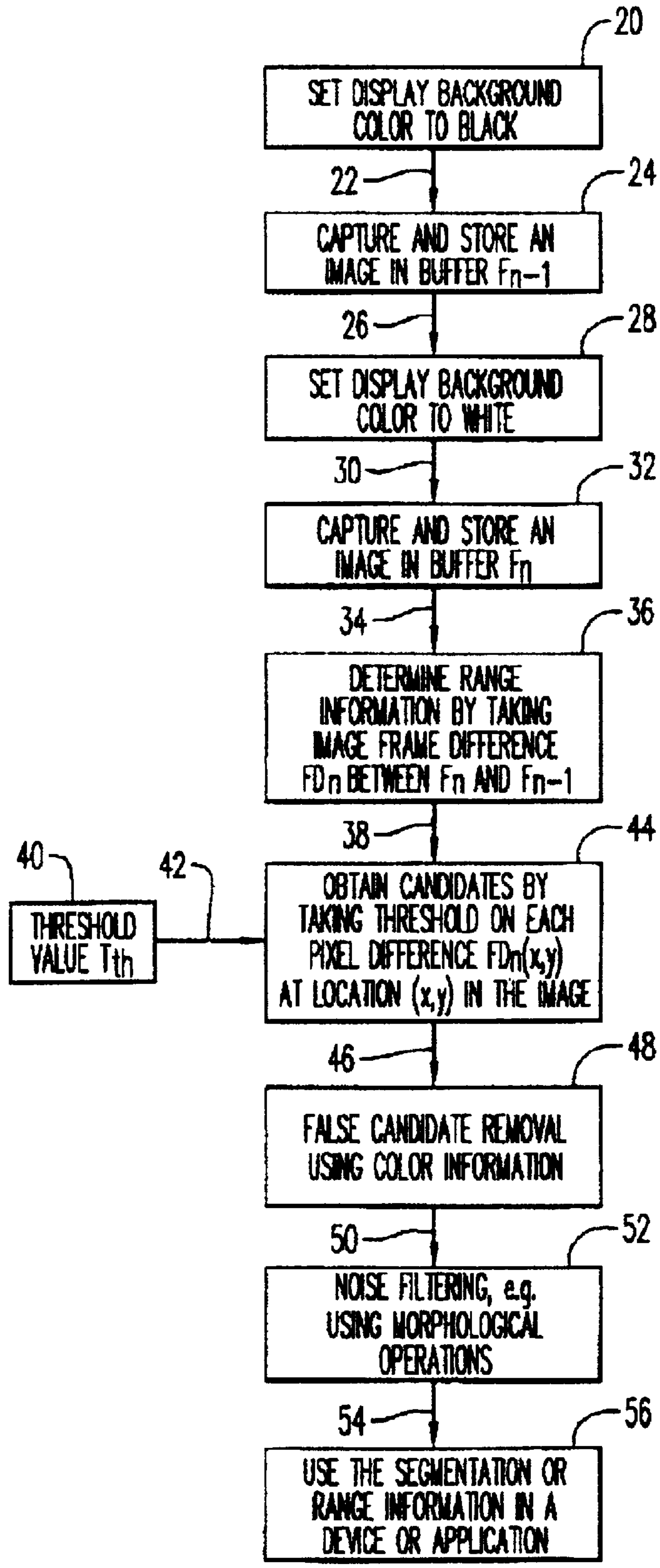
FIG. 2 is a flow chart of the method carried out by the system seen in FIG. 1.

FIG. 2 is an example of embodiment of a routine which could run on 8 of FIG. 1 to determine the rough range information and consequently the segmentation of the object in the scene closest to the camera 6 and display 4. Range sensing of an interested object 2 is done by examining two consecutive images of a scene including the object that are taken from a single camera 6 located next to a display 4 under different computer display's brightness. Camera 6 and computer display 4 should be roughly synchronized to ensure the images are captured under desired brightness. For example, the system captured an image at time n-1 and stored it in memory buffer $F_{n-1}$ 24 after changing the background color of a display to black as shown in block 20. Immediately, the background color of the display was changed to white as indicated by block 28 and the second image is captured and stored in buffer $F_n$ 32. Comparing the two captured images 36 is then followed to discriminate range. The display's light 14 reflected back to the camera 6 depends on the intensity of the display illumination, the ambient room light, the reflectivity of objects in the scene, and the distance of these objects from the display and the camera. Assuming that the reflectivity of objects in the scene is approximately constant, range information for portions of the scene is obtained by taking the difference between the two images, since closer objects will reflect larger light, and consequently the two consecutive images' difference, than objects farther away from computer display and camera. The image difference is then transferred to block 44, as indicated by line 38. At block 44, thresholding is then operated on the luminance difference image to obtain candidates for the closest object in the scene. The threshold value $I_{th}$ 40 is chosen based on the lighting condition of the environment. Objects' motion occurred between these two capturing instant will also contribute to the difference, and consequently might generate false candidates. At block 48 color information is used to further eliminate the false candidates resulting from objects' motion. For example, we can estimate the change of color values contributed by illumination change and then use it to against the actual color values for filtering out false candidates resulting from moving object. In the case that there is no moving object in the scene and the reflectivity of objects in the scene is approximately constant, image difference is only contributed by the illumination change from computer display. The color value of the pixel at location (x,y) can be estimated based on the luminance intensity change of the same pixel and the average color and luminance intensities changes. For the luminance intensity change due to object moving, most likely the color will be different from the estimated color value. Thus, most of the intensity change due to object moving can be filtered out through the comparison of actual color values and estimated color values.

Morphological operations such as dilation and erosion are then used to further remove noise from the segmentation image as indicated by block 52. For example, we also measure the size of each connected object. The objects with significant smaller sizes are then removed. The resulting image which is considered as the segmentation of the object in the scene closest to the camera and display can be sent, as indicated by line 54, to a device indicated by block 56. The device can be a visual display on a terminal, or can be an application running on a computer, or the like.

This method can be extended in different ways but still remain within the scope of this invention. For example, instead of using only two consecutive images taken under different computer displays' illumination, other options are having integration of several images to reach different desired illumination, or having structured computer display illumination aided by integration to remove camera noise.

Applications of the system are targeted for the emerging human-computer gesture interaction. Substantial value would be added to personal computer products that would be capable of allowing human use gesture to control graphical user interface in computers.

The system can also be used for screen saver applications. Screen saver applications are activated when keyboard/mouse are idle for a preset idle time. This becomes very annoying when a user needs to look at the contents on the display and no keyboard/mouse actions are required. The invention can be used to detect whether a user is present and, in turn, to decide whether a screen saver application need to be activated.

The invention having been thus described with particular reference to the preferred forms thereof, it will be obvious that various changes and modifications may be made therein without departing form the spirit and scope of the invention as defined in the appended claims.

What is claimed is:

1. A system for sensing a proximity of an object to an active source of lighting, comprising a display, wherein a brightness of said display is operable as an active source of illumination;

a camera, capable of capturing still or video images of at least one objects placed in front of said display; and a computer connected to and controlling said display and said camera, wherein said computer synchronizes an operation of said display and said camera, and wherein said camera captures images of said at least one object corresponding to different levels of said brightness of said display.

2. A method for sensing a proximity of objects to a display, comprising the steps of:

varying an illumination of said objects using different levels of display brightness;

capturing images with a video camera corresponding to said different levels of display brightness;

processing data in said images with a computer to select candidates for said objects that are closest to said display.

3. The method according to claim 2, further comprising compensating for differences in reflectivity and motion of said objects to reduce a list of said candidates for said objects that are closest to said display.

4. The method according to claim 2, further comprising performing image integration to remove camera noise.

5. The method according to claim 2, further comprising performing morphological operations to filter out noise from said candidates for said objects.

6. A memory medium for a computer comprising:

means for controlling the computer operation to perform the following steps:

flashing the computer display at different brightness levels;

capturing images of objects in the environment with a video camera at each of the different brightness levels;

selecting objects from among the candidates; and performing image integration to remove camera noise.

* * * * *